United States Patent Office 2,853,473
Patented Sept. 23, 1958

2,853,473

PRODUCTION OF CARBODIIMIDES

Tod W. Campbell and John J. Verbanc, Wilmington, Del., assignors to E. I. du Pont de Nemours and Company, Wilmington, Del., a corporation of Delaware No Drawing. Application August 27, 1956
Serial No. 606,187

7 Claims. (Cl. 260—77.5)

This invention relates to a process for the preparation of carbodiimides, and more particularly to a process for the preparation of carbodiimides involving the use of phosphorus-containing catalysts.

Carbodiimides such as diphenylcarbodiimide are known. These compounds have been described in Chemical Reviews, vol. 53 (1953), pages 145–166, and in Chemistry of Carbon Compounds, vol. III–A, page 205, Elsevier Publishing Company (1954). In general, these carbodiimides have been prepared by treating a di-substituted thiourea with a metallic oxide, such as mercuric oxide. This method of preparation is not entirely satisfactory in view of the attendant side reactions, such as the reaction of the water by-product with the carbodiimides to form a urea. Accordingly, it would be highly desirable to provide a process for the preparation of these carbodiimides which is free of these undesirable features. In addition, this type of process is not satisfactory for the preparation of polymeric compounds containing a plurality of carbodiimide linkages.

It is an object of the present invention to provide a process for the preparation of organic carbodiimides. A further object is to provide a process for the preparation of carbodiimides involving the treatment of organic isocyanates with catalytic amounts of phosphorus-containing catalysts. Other objects will appear hereinafter.

These and other objects of the following invention are accomplished by the process of preparing organic carbodiimides which comprises treating an organic isocyanate with a catalytic amount of a phospholine or a phospholidine. The reaction involved is between two isocyanate groups with the formation of a carbodiimide linkage and the liberation of carbon dioxide.

In carrying out the process of the present invention, any organic isocyanate, including monoisocyanates and polyisocyanates, may be used, such as aromatic, aliphatic or cycloaliphatic types. These organic isocyanates may contain other substituents; however, it is readily apparent that these substituents should not be reactive with the isocyanate group or groups. Therefore, they should not be of the active hydrogen-containing type which display activity according to the Zerewitinoff test.

When using an organic monoisocyanate, such as phenylisocyanate, to prepare an organic carbodiimide, the process of the present invention may be illustrated as follows:

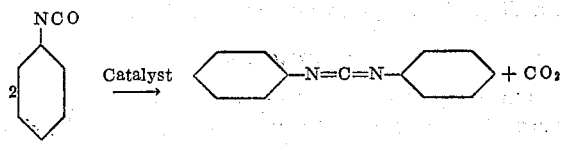

Representative organic monoisocyanates which may be used are methylisocyanate, ethylisocyanate, butylisocyanate, octylisocyanate, octadecylisocyanate, allylisocyanate, vinylisocyanate, pentylisocyanate, phenylisocyanate, o-tolueneisocyanate, p-tolueneisocyanate, o-nitrophenylisocyanate, p-chlorophenylisocyanate, p-methoxyphenylisocyanate, p-biphenylylisocyanate, cyclohexylisocyanate, and decahydronaphthylisocyanate. It is to be understood that mixtures of these monoisocyanates may be used to form unsymmetrical or mixed carbodiimides.

The process of the present invention may also be carried out by using a polyisocyanate, such as a di- or tri-isocyanate. When using an organic diisocyanate, according to the process of the present invention, a condensation polymer having repeating carbodiimide linkages is prepared which is of a high molecular weight and is substantially linear. The use of an organic diisocyanate may be illustrated as follows:

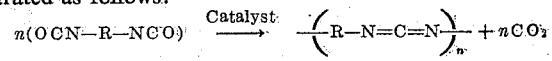

wherein R is a bivalent organic radical and $n$ is an integer greater than 2. Organic diisocyanates which may be used in the process of the present invention include 2,4-tolylene diisocyanate, m-phenylene diisocyanate, 4-chloro-1,3-phenylene diisocyanate, 4,4'-biphenylene diisocyanate, 1,5-naphthylene diisocyanate, tetramethylene diisocyanate, hexamethylene diisocyanate, decamethylene diisocyanate, 1,4-cyclohexylene diisocyanate, 4,4'-methylene-dicyclohexylene diisocyanate, and 1,5-tetrahydronaphthylene diisocyanate. Mixtures of two or more of these organic diisocyanates may be used, in which case the bivalent organic radical R in the above formula will not be the same in each recurring unit. It is also to be understood that isocyanate-terminated polymers may be used in the process of the present invention so as to prepare substantially linear polymers containing a plurality of intralinear carbodiimide linkages. Representative isocyanate-terminated polymers which may be used include the reaction products of a polymer having terminal hydroxyl, amino, or carboxyl groups with a molar excess of an organic diisocyanate. Thus, for example, a glycol such as a polyalkyleneether glycol or a polyester glycol may be reacted with a molar excess of an organic diisocyanate so as to provide an isocyanate-terminated polyurethane. Here again it is to be understood tht mixtures of two or more different isocyanate-terminated polymers may be used in the process of the present invention, in which case the bivalent organic radical R in the above formula will not be the same in each recurring unit. It is readily apparent that any of a wide variety of isocyanate-terminated polymers may be used in the process of the present invention.

It is also to be understood that compounds containing more than two free isocyanate groups may also be used in the process of the present invention. In this case, the resulting organic carbodiimide will be a high molecular weight, substantially cross-linked polymer. Representative compounds containing more than two free isocyanate groups which may be used include 2,4,6-triisocyanato toluene, p-isocyanatophenyl 2,4-diisocyanatophenyl ether, and compounds which are prepared from trifunctional reactants, such as the reaction product of 1 mol of castor oil with 3 mols of a diisocyanate, so as to obtain a compound having three free isocyanate groups. It is readily apparent that any of a wide variety of organic compounds containing more than two free isocyanate groups may be used in the process of the present invention.

As mentioned above, the process of the present invention involves the treatment of these organic isocyanates with catalytic amounts of a phosphorus-containing catalyst such as a phospholine or a phospholidine. Accordingly, catalytic amounts of from about 0.01 to 10.0 parts of catalyst per 100 parts of organic isocyanate can be used. The phospholines which are useful in the process of the present invention are compounds having the formula

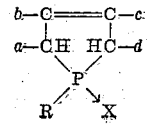

wherein a, b, c and d represent a radical selected from the group consisting of hydrogen, halogen, lower alkyl, lower alkenyl, phenyl, cyclohexyl, and polymethylene groups which, together with two adjacent carbon atoms in the heterocyclic ring, form a cycloaliphatic ring; R is a radical selected from the group consisting of lower alkyl and phenyl radicals; and X is a chalcogen having an atomic weight of from 15 to 33. It is to be understood that the R phenyl radicals may contain inert substituents such as alkyl or halogen radicals. Representative compounds include 1-phenyl-3-phospholine 1-oxide; 3-methyl-1-phenyl-3-phospholine 1-oxide; 1-phenyl-3-phospholine 1-sulfide; 1-ethyl-3-phospholine 1-oxide; 1-ethyl-3-methyl-3-phospholine 1-oxide; 1-ethyl-3-methyl-3-phospholine 1-sulfide; and 2-phenylisophosphindoline 2-oxide. For purposes of the present invention, 1-ethyl-3-methyl-3-phospholine 1-oxide is preferred. These phospholine oxides and sulfides are more particularly described in U. S. Patents 2,663,737 and 2,663,738.

The phospholidines which may be used in the process of the present invention are compounds having the formula

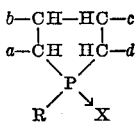

wherein a, b, c, d, R, and X have the significance defined above. Representative phospholidines include 1-phenylphospholidine 1-oxide and 1-ethyl-3-methylphospholidine 1-oxide. These phospholidines are more particularly described in U. S. Patent 2,663,739.

In carrying out the process of the present invention, it is necessary merely to treat the organic isocyanate or polyisocyanate with a catalytic amount of the phosphorus-containing catalyst. As the organic carbodiimide is formed, carbon dioxide is liberated and this carbon dioxide may be vented from the reaction medium if desired. In carrying out the process of the present invention, it is usually desirable to heat the organic isocyanate with the catalyst to a temperature of from about room temperature to about 300° C. It is to be understood that with particularly active organic isocyanates and catalysts, heating may not be necessary, and this temperature range may be varied within the stated limits depending on the particular organic isocyanate and catalyst which are being used.

The process of the present invention may be carried out in bulk or in solution depending on the particular organic isocyanate being used. Thus, when the organic isocyanate is a solid, it may be dissolved in an inert solvent, such as benzene, toluene, xylene, nitromethane, etc., and the appropriate amount of phosphorus-containing catalyst added. Depending on the solubility of the resulting carbodiimide and the solvent employed, recovery is accomplished by either evaporating the solvent from the soluble organic carbodiimide or filtering off the insoluble organic carbodiimide. In the cases where the organic isocyanate reactant is itself a liquid, the use of an inert solvent is not necessary. In this case, the phosphorus-containing catalyst is added directly to the organic isocyanate, whereupon the entire mass is converted to the organic carbodiimide.

The carbodiimides which are prepared according to the process of this invention have a number of interesting uses in chemical synthesis due to the reactivity of the N=C=N group or groups. The carbodiimides may be reacted with soda cellulose to form a modified cellulose as disclosed in U. S. Patent 2,415,043. The products of the reaction, depending on the particular conditions, are useful as textile sizes, coating compositions and molding powders. In addition, the polymeric compounds containing a plurality of carbodiimide linkages which are prepared from organic compounds containing two or more free isocyanate groups have a wide variety of uses, such as in fibers, films, sheets, elastomers, etc. The carbodiimides which are prepared from organic compounds containing three or more free isocyanate groups are particularly useful in the preparation of cellular products.

The following examples will better illustrate the nature of the present invention; however, the invention is not intended to be limited to these examples. Parts are by weight unless otherwise indicated.

*Example 1*

A. Into 44 parts of dry xylene is placed 12 parts of 2,4-tolylene diisocyanate and several small crystals of 3-methyl-1-phenyl-3-phospholine 1-oxide, and the mixture is refluxed. After about an hour, a vigorous evolution of carbon dioxide occurs and a polymeric mass forms. This is a polymeric toluene carbodiimide. It was washed in acetone and dried in an oven at 110° C. The polymer is pressed in a hydraulic press at 260° C. for 5 minutes with a platen pressure of 40,000 lbs. per sq. in. A tough, smooth, transparent film of about 2–3 mils thickness is obtained. It is very difficult to tear, is rather stiff and is extremely mar resistant.

B. The substitution of 1-ethyl-3-methyl-3-phospholine 1-oxide for the phenyl derivative causes an immediate evolution of carbon dioxide and formation of polymer within half an hour.

C. The following catalysts, when substituted in the process described in A above, result in the formation of a polymeric toluene carbodiimide having similar properties:

3-methyl-1-ethylphenyl-3-phospholine 1-oxide
3-chloro-1-phenyl-3-phospholine 1-oxide
3-(4-methyl-3-pentenyl)-1-phenyl-3-phospholine 1-oxide
1-phenyl-3-phenyl-3-phospholine 1-oxide
3-methyl-1-phenyl-3-phospholine 1-sulfide
1-ethyl-3-methyl-3-phospholine 1-sulfide
1-phenyl-3-phospholine 1-oxide
1-ethyl-3-methylphospholidine 1-oxide
1-phenylphospholidine 1-oxide
1-phenylisophosphindoline 1-oxide

*Example 2*

119 parts of phenylisocyanate is treated with 0.3 part of 1-ethyl-3-methyl-3-phospholine 1-oxide while stirring. Carbon dioxide is evolved and the temperature is maintained at 26–28° C. with slight cooling. Stirring is continued for 2.25 hours. The pale green, slightly viscous liquid is distilled through a column. A nearly quantitative yield of diphenylcarbodiimide is collected, boiling at 107–121° C. at 0.3 mm. of mercury pressure.

*Example 3*

100 parts of p-methoxyphenylisocyanate is dissolved in 85 parts of xylene and 0.06 part of 1-ethyl-3-methyl-3-phospholine 1-oxide is added. The solution is boiled for 4 hours. The solvent is then distilled off at atmospheric pressure and the residue is distilled 1.3 mm. of mercury pressure. The bis(p-methoxyphenyl)carbodiimide is collected at 193–194° C. The pale yellow distillate, which is practically a quantitative yield, crystallizes on standing. The crystals melt at 52–53° C.

*Example 4*

100 parts of p-tolueneisocyanate is dissolved in 127 parts of xylene and 0.02 part of 1-ethyl-3-methyl-3-phospholine 1-oxide is added. The solution is refluxed for 4 hours and the xylene is then distilled off. The di(p-tolyl)carbodiimide is obtained in 88% yield boiling at 165° C. at 2.4 mm. of mercury pressure. The carbodiimide crystallizes on standing. The crystals melt at 56.5–57.5° C. Analysis shows: C—80.85%; H—6.20%; N—12.44%. Theory: C—81.1%; H—6.3%; N—12.6%.

Example 5

10 parts of phenylisocyanate is dissolved in 66 parts of xylene and 0.15 part of 1-ethyl-3-methyl-3-phospholine 1-oxide is added. The solution is boiled and carbon dioxide evolved. The xylene is distilled off and the diphenylcarbodiimide is collected as a pale yellow distillate boiling at 110–120° C. and 0.5 mm. of mercury pressure.

Example 6

A. 30 parts of p-chlorophenylisocyanate is dissolved in 50 parts of xylene. 1.5 parts of 1-ethyl-3-methyl-3-phospholine 1-oxide is then added and the solution is refluxed for 4 hours. The xylene is removed under vacuum and the residue taken up in hot petroleum ether, filtered and evaporated to incipient crystallization and cooled. The bis(p-chlorophenyl)carbodiimide crystals separate and are filtered off, washed with petroleum ether and dried.

B. p-Nitrophenylisocyanate may be used in A above in a similar manner.

Example 7

A solution of 10 parts of amylisocyanate in 25 parts of decahydronaphthalene is treated with 0.1 part of 1-ethyl-3-methyl-3-phospholine 1-oxide, and the mixture is heated to reflux. Carbon dioxide is evolved, and after 4 hours the infrared absorption spectrum of the solution shows the presence of carbodiimide functionality with substantially no isocyanate functionality.

Example 8

3.12 parts of hexamethylene diisocyanate is added to 6 parts of xylene in a vessel equipped with a reflux condenser and an atmosphere of nitrogen is maintained in the vessel. To the solution is added 0.05 part of 1-ethyl-3-methyl-3-phospholine 1-oxide. The solution is heated to 80° C., whereupon a mild effervescence is noted. The mixture is heated for 2 hours at 80° C., then 16 hours at 120° C.

The pale yellow precipitate is filtered, washed five times with 8-part portions of acetone and dried at 100° C. The pale orange, dried precipitate is very tough. The polymer can be pressed to a thin film at about 260–270° C. Infrared spectra obtained by grinding the polymer show it to be the carbodiimide.

Example 9

9 parts of ethylisocyanate is dissolved in 8 parts of toluene in a vessel equipped with a reflux condenser and in which an atmosphere of nitrogen is maintained. To the solution is added 0.7 part of 1-ethyl-3-methyl-3-phospholine 1-oxide and the solution is heated at 100–105° C. for 6 hours. The excess ethylisocyanate is distilled off and the toluene separated from the diethylcarbodiimide by fractional distillation. The yield is approximately 50%. An infrared absorption spectrum shows the presence of the characteristic carbodiimide band at 4.72 microns.

Example 10

A mixture of 33.7 parts of polytetramethyleneether glycol having an average molecular weight of about 2000 is heated on the steam bath for 1½ hours with 8.7 parts of methylenedi(p-phenylene)diisocyanate. The reaction product is diluted with 190 parts of xylene containing 0.1 part of 1-ethyl-3-methyl-3-phospholine 1-oxide. After refluxing for about 1 hour, a viscous solution suitable for spinning is obtained. This solution remains free of gel for over 48 hours and may be dry-spun into yarn. Casting the viscous solution yields a clear, very tough, snappy sheet of elastomer. A strip of this sheet elongated 600% shows good recovery.

Example 11

195 parts of castor oil having a hydroxyl number of 161 and 100 parts of 2,4-tolyene diisocyanate are mixed together and heated at 90° C. for 1 hour. The resulting product contains 3 free isocyanate groups per molecule. The mass is cooled to about 50° C. and 2 parts of 3-methyl-1-phenyl-3-phospholine 1-oxide is thoroughly stirred in. The mass is poured immediately into a mold and heated at 100° C. for 2 hours. A tough, flexible, cellular form is obtained.

Example 12

275 parts of polytetramethyleneether glycol having a molecular weight of 2730 is mixed with 57 parts of 2,4,6-triisocyanatotoluene and heated at 90° C. for 1 hour. The resulting polymer has 4 free isocyanate groups per molecule. The mass is cooled to 50° C. and 3.0 parts of 3-methyl-1-phenyl-3-phospholine 1-oxide is thoroughly mixed in and the mass is poured into a mold and heated for 2 hours at 100° C. The resulting cellular product is tough and resilient and is suitable for use in foam-type cushions.

As many widely different embodiments of this invention may be made without departing from the spirit and scope thereof, it is to be understood that this invention is not limited to the specific embodiments thereof except as defined in the appended claims.

What is claimed is:

1. In the process for preparing organic carbodiimides from organic isocyanates having no active hydrogen-containing substituents which are reactive with an isocyanate group, the step comprising treating said organic isocyanate with from 0.01 to 10.0 parts by weight of a phosphorus compound per 100 parts by weight of said isocyanate, said phosphorus compound being selected from the group consisting of a substituted phospholine having the formula

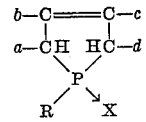

and a substituted phospholidine having the formula

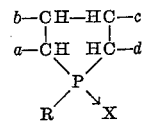

wherein $a$, $b$, $c$ and $d$ represent a radical selected from the group consisting of hydrogen, halogen, lower alkyl, lower alkenyl, phenyl, cyclohexyl, and polymethylene groups which, together with two adjacent carbon atoms in the heterocyclic ring, form a cycloaliphatic ring; R is a radical selected from the group consisting of lower alkyl and phenyl radicals; and X is a chalcogen having an atomic weight of from 15 to 33.

2. In the process for preparing organic carbodiimides from organic monoisocyanates having no active hydrogen containing substituents which are reactive with an isocyanate group, the step comprising treating said organic monoisocyanate with from 0.01 to 10.0 parts by weight of 3-methyl-1-phenyl-3-phospholine 1-oxide per 100 parts of organic monoisocyanate.

3. In the process for preparing organic carbodiimides from organic polyisocyanates having no active hydrogen containing substituents which are reactive with an isocyanate group, the step comprising treating said organic polyisocyanate with from 0.01 to 10.0 parts by weight of 3-methyl-1-phenyl-3-phospholine 1-oxide per 100 parts of organic polyisocyanate.

4. In the process for preparing organic carbodiimides from organic monoisocyanates having no active hydrogen containing substituents which are reactive with an isocyanate group, the step comprising treating said organic monoisocyanate with from 0.01 to 10.0 parts by weight of 1-ethyl-3-methyl-3-phospholine 1-oxide per 100 parts of organic monoisocyanate.

5. In the process for preparing organic carbodiimides from organic polyisocyanates having no active hydrogen containing substituents which are reactive with an isocyanate group, the step comprising treating said organic polyisocyanate with from 0.01 to 10.0 parts by weight of 1 - ethyl - 3 - methyl - 3 - phospholine 1-oxide per 100 parts of organic polyisocyanate.

6. A process according to claim 1 wherein the organic isocyanate is an isocyanate-terminated polyurethane polymer.

7. A process according to claim 6 wherein the isocyanate-terminated polyurethane polymer is prepared by reacting a polyalkyleneether glycol with a molar excess of an organic diisocyanate.

References Cited in the file of this patent

Saunders et al.: Chemical Reviews, vol. 43, page 214 (1948).

Stolle Deutsche Chemische Gesellschaft (Berichte), vol. 41, pages 1125–1126 (1908).